March 1, 1960 D. W. WOODWARD ET AL 2,927,024
MULTILAYER COLOR PHOTOGRAPHIC FILM
Filed Dec. 23, 1955 6 Sheets-Sheet 1

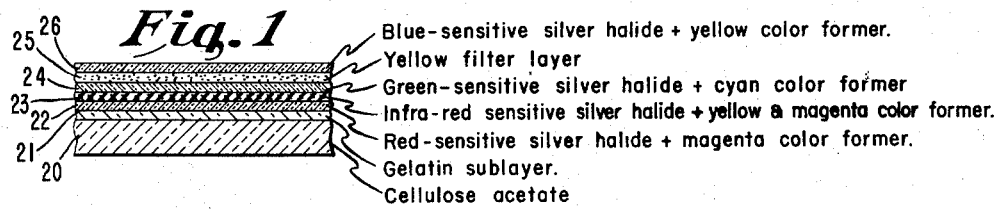

Fig. 1
- 26 Blue-sensitive silver halide + yellow color former.
- 25 Yellow filter layer
- 24 Green-sensitive silver halide + cyan color former
- 23 Infra-red sensitive silver halide + yellow & magenta color former.
- 22 Red-sensitive silver halide + magenta color former.
- 21 Gelatin sublayer.
- 20 Cellulose acetate

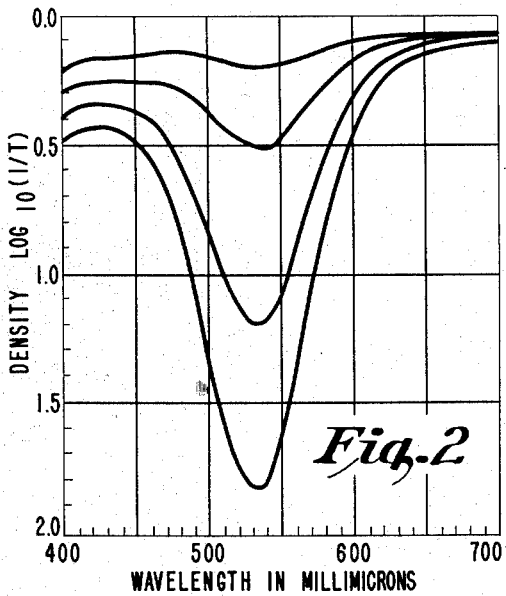

Fig. 2

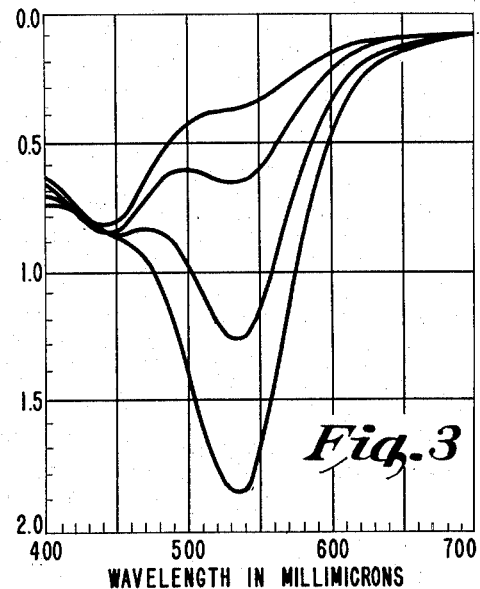

Fig. 3

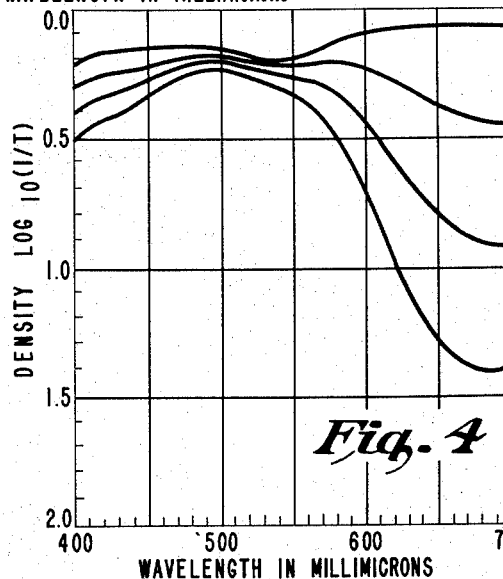

Fig. 4

INVENTORS
DAVID WILLCOX WOODWARD
VICTOR FU-HUA CHU
BY
ATTORNEY

March 1, 1960 D. W. WOODWARD ET AL 2,927,024
MULTILAYER COLOR PHOTOGRAPHIC FILM
Filed Dec. 23, 1955 6 Sheets-Sheet 2

INVENTORS
DAVID WILLCOX WOODWARD
VICTOR FU-HUA CHU
BY Lynn Barratt Morris
ATTORNEY

Fig. 8
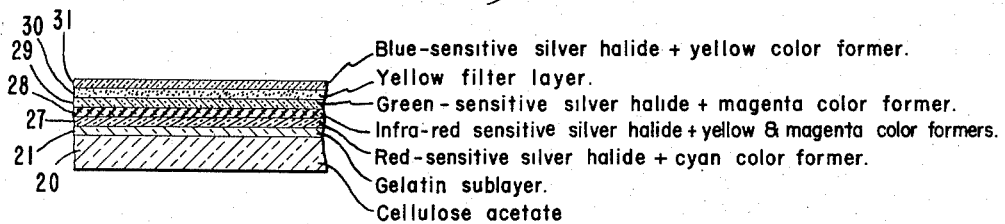
- 30, 31 — Blue-sensitive silver halide + yellow color former.
- 29 — Yellow filter layer.
- 28 — Green-sensitive silver halide + magenta color former.
- 27 — Infra-red sensitive silver halide + yellow & magenta color formers.
- 21 — Red-sensitive silver halide + cyan color former.
- 20 — Gelatin sublayer.
- Cellulose acetate
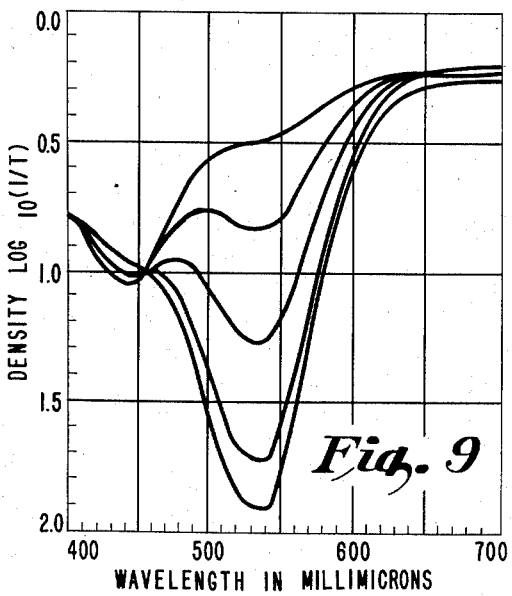
Fig. 9
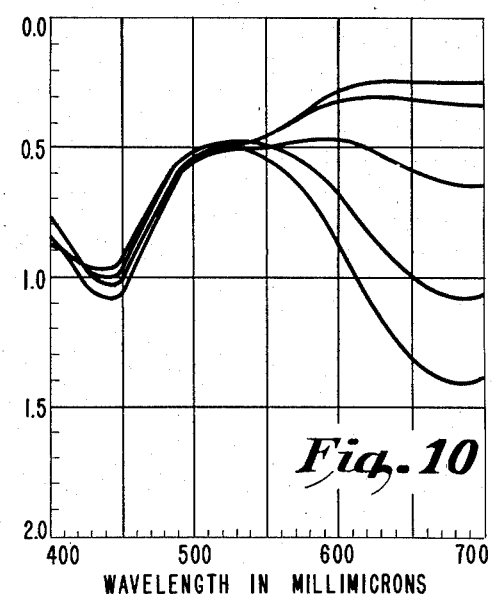
Fig. 10
INVENTORS
DAVID WILLCOX WOODWARD
VICTOR FU-HUA CHU March 1, 1960   D. W. WOODWARD ET AL   2,927,024
MULTILAYER COLOR PHOTOGRAPHIC FILM
Filed Dec. 23, 1955   6 Sheets-Sheet 4

Fig. 11

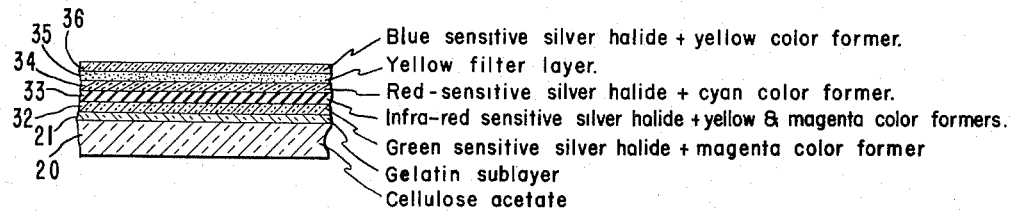

- 36 Blue sensitive silver halide + yellow color former.
- 35 Yellow filter layer.
- 34 Red-sensitive silver halide + cyan color former.
- 33 Infra-red sensitive silver halide + yellow & magenta color formers.
- 32 Green sensitive silver halide + magenta color former
- 21 Gelatin sublayer
- 20 Cellulose acetate

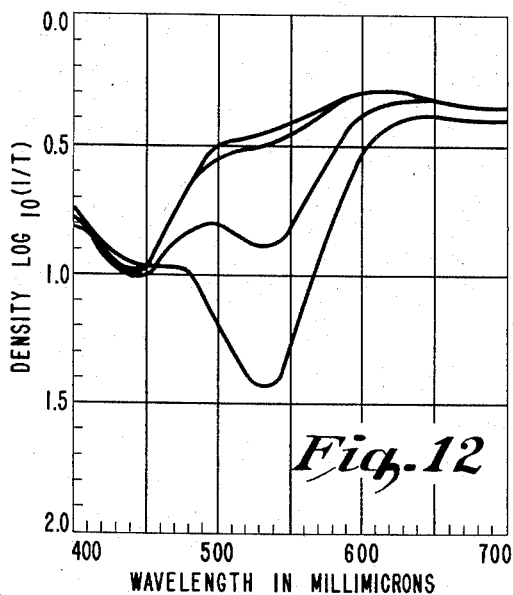

Fig. 12

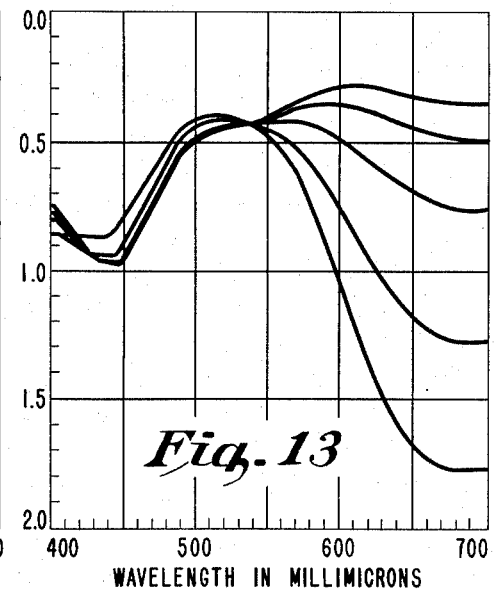

Fig. 13

INVENTORS
DAVID WILLCOX WOODWARD
VICTOR FU-HUA CHU

BY Lynn Barratt Morris
ATTORNEY

March 1, 1960     D. W. WOODWARD ET AL     2,927,024
MULTILAYER COLOR PHOTOGRAPHIC FILM
Filed Dec. 23, 1955     6 Sheets-Sheet 5

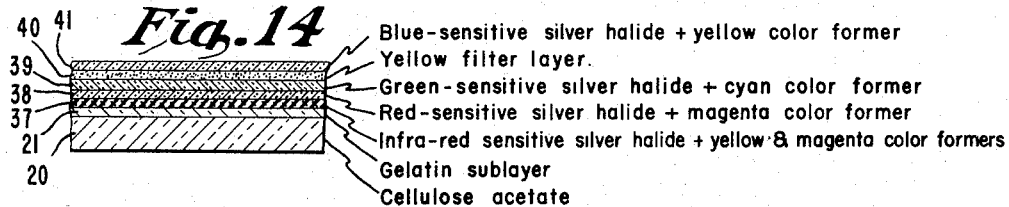

Fig. 14
- Blue-sensitive silver halide + yellow color former
- Yellow filter layer.
- Green-sensitive silver halide + cyan color former
- Red-sensitive silver halide + magenta color former
- Infra-red sensitive silver halide + yellow & magenta color formers
- Gelatin sublayer
- Cellulose acetate

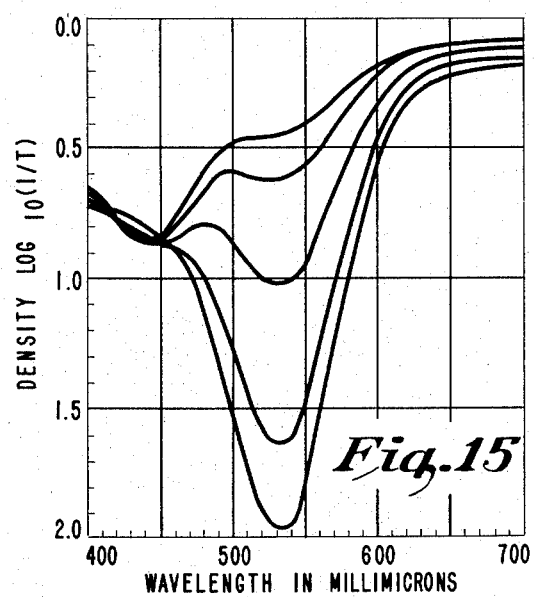

Fig. 15

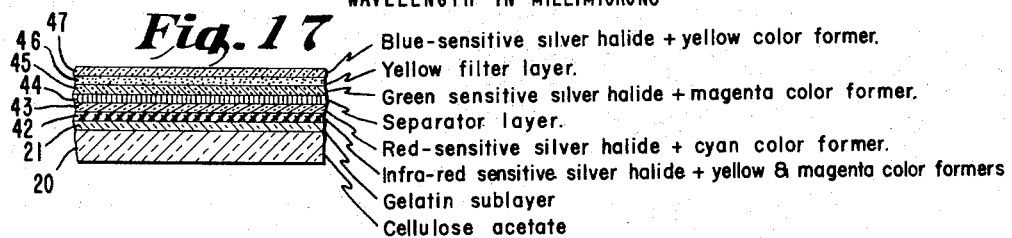

Fig. 17
- Blue-sensitive silver halide + yellow color former.
- Yellow filter layer.
- Green sensitive silver halide + magenta color former.
- Separator layer.
- Red-sensitive silver halide + cyan color former.
- Infra-red sensitive silver halide + yellow & magenta color formers
- Gelatin sublayer
- Cellulose acetate

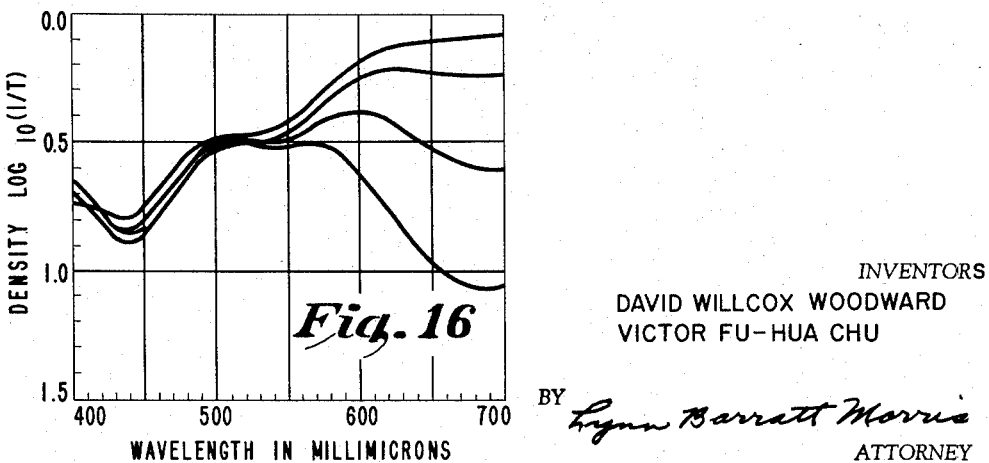

Fig. 16

INVENTORS
DAVID WILLCOX WOODWARD
VICTOR FU-HUA CHU

BY Lynn Barrett Morris
ATTORNEY

March 1, 1960   D. W. WOODWARD ET AL   2,927,024
MULTILAYER COLOR PHOTOGRAPHIC FILM
Filed Dec. 23, 1955   6 Sheets-Sheet 6

INVENTORS
DAVID WILLCOX WOODWARD
VICTOR FU-HUA CHU

BY *Lynn Barratt Morris*
ATTORNEY

_Patented Mar. 1, 1960_

2,927,024

MULTILAYER COLOR PHOTOGRAPHIC FILM

David Willcox Woodward, Little Silver, and Victor Fu-Hua Chu, Metuchen, N.J., assignors to E. I. du Pont de Nemours and Company, Wilmington, Del., a corporation of Delaware Application December 23, 1955, Serial No. 555,128

10 Claims. (Cl. 96—74)

This invention relates to color photography and more particularly to photographic elements and processes of forming colored images. Still more particularly, it relates to multilayer photographic films which contain light-sensitive silver halide emulsion layers of different sensitivities, each containing a non-diffusing color-former which results in a subtractive dye, and a light-sensitive layer containing a non-diffusing color-former which will yield a masking dye image.

Subtractive three color reproduction of the negative-positive type utilizes, in the most common form, three non-diffusing subtractive dyes. By subtractive is meant dyes which have a single absorption band in the radiation region of between about 350 millimicrons to 750 millimicrons. For positive images that are to be viewed these dyes must be complementary to the three primary colors, blue, green and red; these are yellow (minus blue), magenta (minus green) and cyan (minus red). In the case of a negative, duplicating negative or master positive, more latitude is possible since the image is to be "viewed" by another film whose sensitivity, unlike that of the eyes, can be shifted to longer or shorter wave lengths. Similarly, although a camera negative film will have peak sensitivities at about 470 m$\mu$, 560 m$\mu$, and 660 m$\mu$, the duplicating negative, master positives and release positives may have maximum sensitivities at other wave lengths corresponding to the absorption maxima of the dye images they are to be printed from. However, none of the available dyes possess ideal spectral absorption characteristics since they all absorb to some extent in regions where one or more of the other dyes also absorb light. As a result there is contamination of one dye image with another resulting in duller less saturated colors. For instance, the cyan (minus red) dye image absorbs to some extent in the blue and green region and hence controls not only the red light but to a lesser extent the blue and green record. The other dyes likewise have unwanted absorption. If steps are not taken to correct these deficiencies, generally unsatisfactory and dull color reproduction results. One of the best methods for correcting the spectral characteristics of the dyes is by means of masking images in the negative and intermediate films. These masking images in general are formed in the color of the unwanted absorption of one of the subtractive dyes but are opposite in sign to the unwanted absorption, i.e., for correcting a negative image the mask will be a positive image whose color is that of the undesirable absorption of the negative image.

Various procedures have been proposed for the formation of masking images, but they have various economic and other disadvantages, including excessive mask density, imperfect masking over the full density range, correction in only narrow spectral ranges, tedious processing and difficulty in controlling the reproducibility.

An object of this invention is to provide new mutilayer photographic negative or intermediate color films which can be readily processed to multicolor images with an integral color correction masking image or images. Another object is to provide such films which can be made in a simple manner. A further object is to provide such films which can be made by the use of the standard photographic coating equipment. A still further object is to provide such films which can be processed in a relatively simple manner. Yet another object is to provide a process of producing color-corrected multicolor images utilizing such films. Still further objects will be apparent from the following description.

In assignee's Woodward and Chu application Ser. No. 468,260, filed Nov. 12, 1954, a method is described for integral color correction wherein a conventional mutilayer color film containing color formers in the record emulsion layers is provided with auxiliary relatively slower emulsion layers sensitive primarily to radiation of wavelength longer than visible light and also containing color formers capable of forming dyes absorbing in the region where the record layer dyes has unwanted absorption and so composed as to form, on supplemental exposure to infrared light during normal processing, a mask to correct for the unwanted absorption of one of the record layers.

An advantageous modification of the invention of the Woodward and Chu application has now been discovered whereby two dye images preferably the cyan and magenta which have the highest contamination can be simultaneously corrected by a single mask layer. This is highly desirable since it provides for more color correction with a less expensive film and, more important, a thinner film with less internal scattering and hence a sharper image.

The mask latent image which, of course, is opposite in sign to the image being corrected is formed, it is believed, in part by light either transmitted by or reflected from the unexposed silver halides of the record layers depending on the side of the film given the supplemental exposure.

A supplemental exposure to infrared radiation during development forms a latent image in the mask layer. This image, which is opposite in sign to the images of the adjacent layers being corrected is believed to be formed, at least in part, by light either transmitted by or reflected from the unexposed silver halides of the adjacent record layers. Whether the exposure is by transmitted or reflected light depends, naturally, on which side the exposure is made from and the relationship of the individual layers. In any case the developed silver of the record images absorbs light and prevents exposure of the mask image in such areas. This can be demonstrated by the fact that correction can be obtained when the exposure is made from either side of a given film or conversely for a given supplemental exposure the auxiliary layer may be on either side of the emulsion layer being corrected. This can be seen in Example III where the same film is given a supplemental exposure from either side with comparable results. Following is a more detailed description of some of the film elements that form a part of this invention as applied to a three color subtractive process.

The multilayer films of this invention comprise a transparent film base which carry three light-sensitive silver halide layers so disposed and sensitized that each layer is essentially sensitive to a different region of the visible spectrum and each such layer contains a non-diffusing color former capable of yielding a subtractive dye on development with a primary amine-containing aromatic developing agent, which dyes have varying amounts of unwanted absorption in other regions of the spectrum, and a masking silver halide layer sensitive to light of wavelengths above about 700 millimicrons and relatively insensitive to light below 700 millimicrons adjacent to the film support or located between the lower two record emulsions which said masking layer contains non-diffusing color formers capable of yielding subtractive dyes of the aforesaid type having principal absorption spectra in the regions of the unwanted absorption of the subtractive dyes in the two layers closest to said auxiliary dye masking layer.

A multilayer film layer as described above is exposed to a scene, a multicolor image of the scene or to three color separation layers of such a scene. The film is then developed in a solution containing a primary amine-containing aromatic color developing agents whereby a silver image and a subtractive dye image are formed simultaneously. During this development the masking silver halide emulsion layer is given a supplementary exposure from either or both sides of the element to light of wavelengths greater than 700 m$\mu$ and for such a period that there occurs no significant exposure of the other emulsion layer, and continuing the development whereby a masking image opposite in sign to the record images is formed and corrects the unwanted partial image of the record images nearest to the masking layer. The multilayer film elements of the invention of course, will vary in structure because the different record image layers can be disposed in a number of different arrangements. However, the preferred and most desirable forms of this invention are when the masking layer is as near the support as possible so that as little interference with or scattering of the original exposure occurs. In this way the sharpest possible record is obtained. For the sake of simplicity and clarity in explaining the invention reference will be made to films having light sensitive silver halide emulsion layer arrangements from the normal exposure surface to the film support as follows:

(1) Blue, green and red sensitive and
(2) Blue, red and green sensitive, it being understood that a yellow filter layer or stratum may be disposed in front of the green and red layers to prevent their exposure by blue light. However, if these lower two layers are rendered less sensitive to blue light than the blue sensitive layer such a yellow filter layer is not needed. Also the color correction obtained by this invention can be applied to films having other sensitivity arrangements.

Since the most serious contamination is due to the blue absorption of the cyan and magenta dyes and the green absorption of the cyan dye, this invention is most useful when these two color forming layers are adjacent or separated only by the mask layer so that both can be corrected by the single mask layer. Because obtaining maximum sharpness requires that the mask layer be as near the support as possible, the following arrangement of color formers are those most useful in the invention.

A. (1) Yellow, (2) magenta, (3) orange mask, (4) cyan and film base.
B. (1) Yellow, (2) magenta, (3) cyan, (4) orange mask and film base.
C. Yellow, cyan, orange mask, magenta and film base.
D. Yellow, cyan, magenta, orange mask and film base.

Although the color former used in the mask is referred to as orange, the most practical orange dye would absorb more strongly in the region of 400 to 450 m$\mu$ and 500 to 550 m$\mu$ than between 450 and 500 m$\mu$ since these values correspond more closely to the sensitivities of multilayer film on which these corrected films will be printed. A mixture of a yellow color former yielding a dye having an absorption maximum near 445 m$\mu$ and a magenta color former having an absorption maximum near 533 m$\mu$ is preferred to an orange color former yielding a dye having a single absorption maximum near 475 m$\mu$.

In any of the films having the above sensitivities (1 and 2) and color former arrangements A, B, C and D the blue densities of the cyan and magenta and the green density of the cyan are automatically corrected when the film after exposure to a scene or a record of a scene is color developed and during development given an overall exposure from either the front or back side to infrared radiation of wavelength greater than 700 millimicrons. When development is completed and the silver and silver salts removed the film contains in addition to the normal three negative dye images, orange positive images corresponding to the negative magenta image and the cyan negative image or vice versa. When the contrast of these correcting images have been made at least equal but opposite in sign to that of the unwanted components of the magenta and cyan images, the magenta dye image no longer will modulate blue light and the cyan image will no longer modulate blue and green light and hence, are corrected for the unwanted absorption. The contrast of the orange positive image is determined by (a) the gamma of the record images to the supplementary exposing light at the time of exposure, (b) the inherent contrast of the auxiliary layer and (c) the development conditions subsequent to exposure. The desired contrast of the masking image is of course low, since the unwanted blue absorption of the magenta negative image and the blue and green absorption of the cyan negative image is only about 10 to 30% as great as their blue and green absorptions respectively.

In preparing these films the contrasts of the various component dye images of the unmasked film are determined. Thus the gamma is measured at, for instance, 420, 550 and 690 m$\mu$ for the dye image formed in each layer of the film. The principal undesired values, that of the magenta of 420 and cyan at 420 and 550, are the values to be corrected. Next the gammas of the magenta and cyan layers to the light to be used for supplemental exposure are determined as they would be during development, that is dye plus silver. With these values it is a simple matter to calculate what the inherent gamma of the masking emulsion must be to yield a mask which matches the undesirable gammas of the cyan and magenta images. Of course in some cases it may be desirable to use a mask of higher gamma than would be indicated by the above. For instance, an improvement of color and a partial correction of the unwanted absorption of the dyes in the release positive can be obtained in this way by super proportional masking.

The silver halide emulsions used in the auxiliary layers should be of the finest grain and a preferred type is the transparent, extremely fine grain emulsion known as the Lippmann emulsion. Although such emulsions are normally very slow to visible light, adequate speeds to infrared light are readily obtained by dye sensitization. Suitable sensitizing dyes include 2,2'-diethyl thiatricarbocyanine p-toluene sulfonate,
2,1'-diethyl-3,4-benzothia-4'-carbocyanine iodide,
3,3'-diethyl-5,5'-dimethyl thiatricarbocyanine iodide,
2-ethyl-3,4-benzothia-2'-benzyl-6'-methyl - carbocyanine bromide, and
2,1'-diethyl-6'-bromo-3,4-benzothia-4'-carbocyanine ethosulfate.

Advantages in using such emulsions are that being transparent, they do not scatter light and so do not adversely affect the resolution or sharpness of the film.

In the accompanying drawings which form part of this specification:

Figure 1 is a schematic sectional view of the film element of Example I;

Figure 2 is a graph containing spectrophotometric curves of the magenta dye image of different densities before color correction of the film element of Figure 1;

Figure 3 is a graph containing spectrophotometric curves of the magenta dye image of different densities after color correction of the film element of Figure 1;

Figure 4 is a graph containing spectrophotometric curves of the cyan dye image of different densities before color correction of the film element of Figure 1;

Figure 8 is a schematic sectional view of the film element of Example II;

Figure 9 is a graph containing spectrophotometric curves of the magenta dye image of different densities after color correction of the film element of Figure 8;

Figure 10 is a graph containing spectrophotometric curves of the cyan dye image of different densities after color correction of the film element of Figure 8;

Figure 11 is a schematic sectional view of the film element of Example III;

Figure 12 is a graph containing spectrophotometric curves of the dye image of different densities before color correction of the film element of Figure 11;

Figure 13 is a graph containing spectrophotometric curves of the dye image of different densities after color correction of the film element of Figure 11;

Figure 14 is a schematic sectional view of the film element of Example IV;

Figure 15 is a graph containing spectrophotometric curves of the dye image of different densities before color correction of the film element of Figure 14;

Figure 16 is a graph containing spectrophotometric curves of the dye image of different densities after color correction of the film element of Figure 14;

Figure 17 is a schematic sectional view of the film element of Example V;

Figure 5:
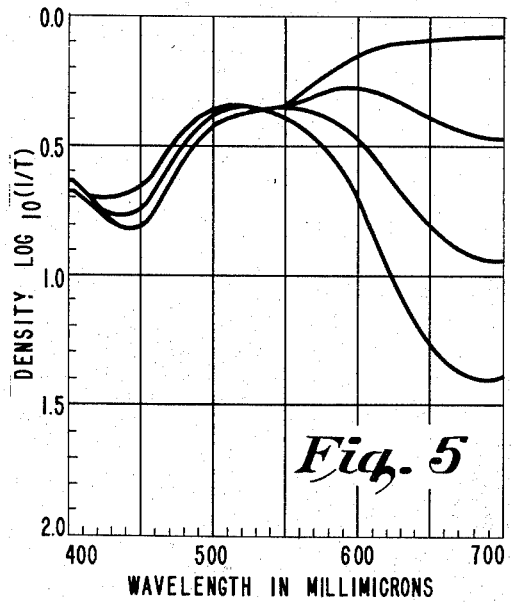
Figure 5 is a graph containing spectrophotometric curves of the cyan dye image of different densities after color correction of the film element of Figure 1.

This application is a continuation-in-part of co-pending application Serial No. 468,260, filed November 12, 1954.

The invention will be further illustrated but is not intended to be limited by the following examples:

*Example I*

A photographic film, as shown in Figure 1 of the drawing, comprises a transparent cellulose acetate film base 20 bearing in order on one surface a thin gelatin sublayer 21, a red-sensitive gelatino-silver halide emulsion layer 22 containing the magenta color-former, 2-cyanoacetyl-3-phenyl-5-benzo-furaldehyde polyvinyl acetal (U.S. Patent 2,680,732), and infrared sensitive Lippmann-type gelatino-silver bromide emulsion layer 23 containing a yellow color-former, m-benzoylacetamidobenzaldehyde polyvinyl acetal (U.S. Patent 2,464,597) and a magenta color-former, m-[p-(5-ethylcarbonato-3-methyl-1-pyrazolyl) benzamido] benzaldehyde polyvinyl acetal (Martin U.S. Patent 2,476,988), a green-sensitive silver halide emulsion layer 24 containing as a cyan color-former, m-(3-methyl salicylamido) benzaldehyde polyvinyl acetal (Martin U.S. Patent 2,489,655), a yellow filter layer 25 composed of yellow colloidal silver dispersed in gelatin as described in assignee's Weaver U.S. Patent No. 2,806,798, dated Sept. 17, 1957, and a blue-sensitive silver halide emulsion layer 26 containing the yellow color-former as described above. The film is given an exposure of low intensity from the emulsion side which exposes all layers except the Lippmann emulsion. After being developed for 2½ minutes at 70° F. in a solution made by admixing the following components:

| | Grams |
|---|---|
| p-Aminodiethylaniline monohydrochloride | 2.5 |
| Sodium sulfite (anhydrous) | 10.0 |
| Sodium carbonate monohydrate | 47.0 |
| Potassium bromide | 2.0 |
| Water to make 1.0 liter | |
| Adjust pH to 10.5 | | is given a second overall exposure, thru a 6" x 6" "Wratten" No. 87 filter from either the emulsion or base side by means of two 100-volt, 100-watt tungsten filament incandescent lamps maintained at a distance of 4 feet from the film, and development is continued for a total of 6 minutes. After development and following a short rinse, the film is treated successively in the first fixer, bleach and second fixer with a water rinse interspersed. These processing solutions have the following compositions:

First fixer:
| | | |
|---|---|---|
| Sodium hyposulfite | grams | 240.0 |
| Sodium sulfite (anhydrous) | do | 15.0 |
| Borax | do | 18.0 |
| Acetic acid, glacial | milliliters | 12.0 |
| Potassium alum | grams | 20.0 |
| Water to make 1.0 liter | | |
| Adjust pH to 4.5 | | |

Bleach:
| | | |
|---|---|---|
| Potassium ferricyanide | grams | 100.0 |
| Potassium bromide | do | 15.0 |
| Water to make 1.0 liter | | |
| Adjust pH to 7.0-8.0 | | |

Second fixer:
| | | |
|---|---|---|
| Sodium hyposulfite | grams | 200.0 |
| Water to make 1.0 liter | | |
| Adjust pH to 7.0 | | |

Figure 6:
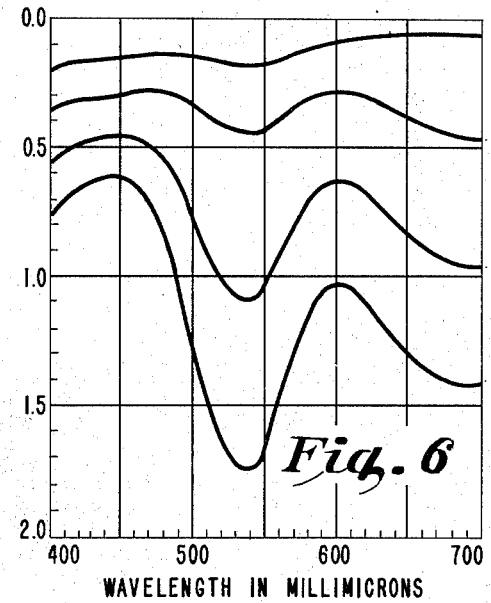
Figure 6 is a graph containing spectrophotometric curves of the superimposed cyan and magenta images of different densities before color correction of the film element of Figure 1.
Figure 7:
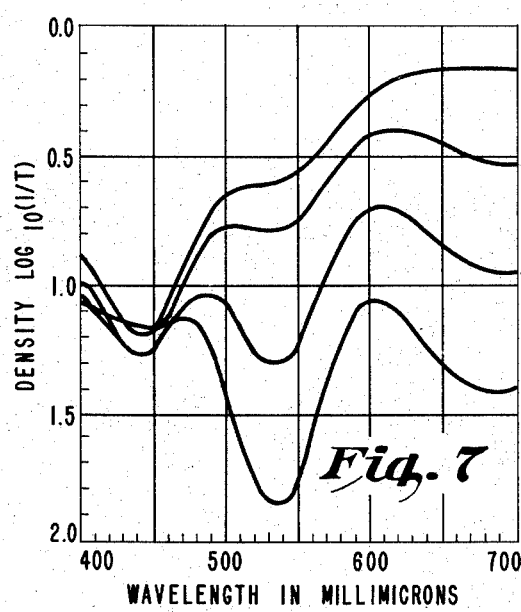
Figure 7 is a graph containing spectrophotometric curves of the superimposed cyan and magenta images of different densities after color correction of the film element of Figure 1.

The film is finally washed and dried. In Figures 2, 3, 4 and 5 are given spectrophotometric curves of the magenta and cyan dye images of different densities respectively before and after color correction by the above-described. It is clearly shown that the unwanted blue absorption of the magenta dye and the unwanted blue and green absorptions of the cyan dye are completely corrected. In Figures 6 and 7 are also given spectrophotometric curves of the superimposed magenta and cyan dye images of different densities, respectively, before and after color correction by the above-described method. It is evident that the unwanted blue absorption of both magenta and cyan dyes is completely corrected simultaneously.

*Example II*

A photographic film, as shown in Figure 8 of the drawing, comprises a transparent cellulose acetate film base 20 bearing in order on one surface a thin gelatin sublayer 21, a red-sensitive gelatino-silver halide emulsion layer 27 containing the cyan color-former as described in Example I, an infrared sensitive Lippman-type gelatino-silver bromide emulsion layer 28 containing the yellow and magenta color-formers as described in Example I, a green-sensitive silver halide emulsion layer 29 containing a magenta color-former as described in Example I, a yellow filter layer 30 similar to that described in Example I, and a blue-sensitive emulsion layer 31 containing a yellow color-former as described in Example I. The film is given an exposure of low intensity from the emulsion side, which exposes all layers except the Lippmann emulsion. After being developed for 2½ minutes at 70° F. in a color developer as described in Example I, the film is given a second overall exposure thru a "Wratten" No. 87 filter from either the emulsion or base side, development is continued for a total of 6 minutes and the film is washed, fixed, bleached, fixed, washed and dried as set forth in Example I. In Figures 9 and 10, there are shown spectrophotometric curves of magenta and cyan dye images of different densities after correction by the above-described method. Comparing these curves with those of Figures 2 and 4, it becomes evident that the unwanted blue absorption of the magenta dye and the unwanted blue and green absorptions of the cyan dye are well corrected.

*Example III*

A photographic film, as shown in Figure 11 of the drawing, comprises a transparent cellulose acetate film base 20 bearing in order on one surface a thin gelatin sublayer 21, a green-sensitive gelatino-silver halide emulsion layer 32 containing the magenta color-former as described in Example I, an infrared sensitive Lippmann-type gelatino-silver bromide emulsion layer 33 containing the yellow and magenta color-formers as described in Example I, a red-sensitive silver halide emulsion layer 34 containing a cyan color-former as described in Example I, a yellow filter layer 35 similar to that described in Example I, and a blue-sensitive emulsion layer 36 containing a yellow color-former as described in Example I. The film is given an exposure of low intensity from the emulsion side, which exposes all layers except the Lippmann emulsion. After being developed for 2½ minutes at 70° F. in a color developer as described in Example I, the film is given a second overall exposure through a "Wratten" No. 87 filter from the emulsion side, development is continued for a total of 6 minutes and the film is washed, fixed, bleached, fixed, washed and dried as set forth in Example I. In Figures 12 and 13, there are shown spectrophotometric curves of magenta and cyan dye images of different densities after correction by the above-described method. Comparing these curves with those of Figures 2 and 4, it becomes evident that the unwanted blue absorption of magenta dye and the unwanted blue and green absorptions of the cyan dye are well corrected.

*Example IV*

A photographic film, as shown in Figure 14 of the drawing, comprises a transparent cellulose acetate film base 20 bearing in order on one surface a thin gelatin sublayer 21, an infrared sensitive Lippmann-type gelatino-silver bromide emulsion layer 37 containing the yellow and magenta color-formers as described in Example I, a red-sensitive gelatino-silver halide emulsion layer 38 containing the magenta color-former as described in Example I, a green-sensitive silver halide emulsion layer 39 containing a cyan color-former as described in Example I, a yellow filter layer 40 similar to that described in Example I, and a blue-sensitive emulsion layer 41 containing a yellow color-former as described in Example I. The film is given an exposure of low intensity from the emulsion side, which exposes all layers except the Lippmann emulsion. After being developed for 2 minutes at 70° F. in a color developer as described in Example I, the film is given a second overall exposure through a "Wratten" No. 87 filter from the emulsion side, development is continued for a total of 6 minutes and the film is washed, fixed, bleached, fixed, washed and dried as set forth in Example I. In Figures 15 and 16, there are shown spectrophotometric curves of magenta and cyan dye images of different densities after correction by the above-described method. Comparing these curves with those of Figures 2 and 4, it is evident that the unwanted blue absorption of the magenta dye and the unwanted blue and green absorptions of the cyan dye are well corrected.

*Example V*

Figure 18:
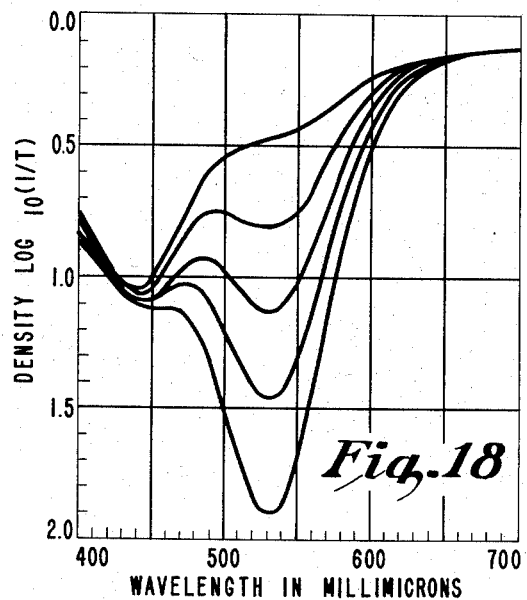
Figure 18 is a graph containing spectrophotometric curves of the dye image of different densities before color correction of the film element of Figure 17.
Figure 19:
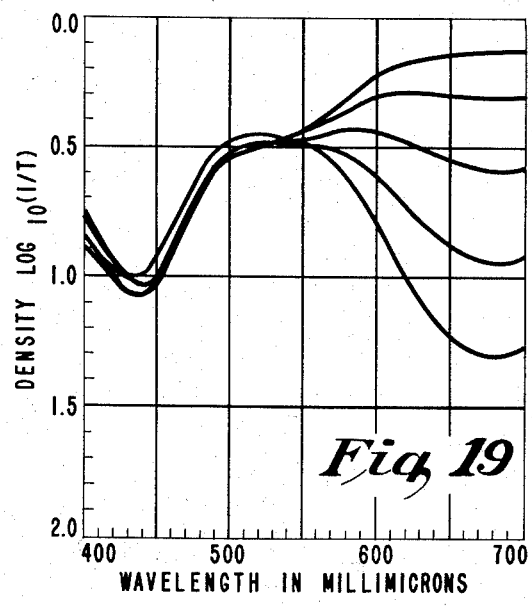
Figure 19 is a graph containing spectrophotometric curves of the dye image of different densities after color correction of the film element of Figure 17.

A photographic film, as shown in Figure 17 of the drawing, comprises a transparent cellulose acetate film base 20 bearing in order on one surface a thin gelatin sublayer 21, an infrared sensitive Lippmann-type gelatino-silver bromide emulsion layer 42 containing the yellow and magenta color-formers as described in Example I, a red-sensitive gelatino-silver halide emulsion layer 43 containing a cyan color-former as described in Example I, a separator layer 44, a green-sensitive silver halide emulsion layer 45 containing a magenta color-former as described in Example I, a yellow filter layer 46 similar to that described in Example I, and a blue-sensitive emulsion layer 47 containing a yellow color-former as described in Example I. The film is given an exposure of low intensity from the emulsion side, which exposes all layers except the Lippmann emulsion. After being developed for 2 minutes at 70° F. in a color developer as described in Example I, the film is given a second overall exposure through a "Wratten" No. 87 filter from the emulsion side, development is continued for a total of 6 minutes and the film is washed, fixed, bleached, fixed, washed and dried as set forth in Example I. In Figures 18 and 19, there are shown spectrophotometric curves of magenta and cyan dye images of different densities after correction by the above-described method. Comparing these curves with those of Figures 2 and 4, it is evident that the unwanted blue absorption of the magenta dye and the unwanted blue and green absorptions of the cyan dye are adequately corrected.

*Example VI*

Figure 20:
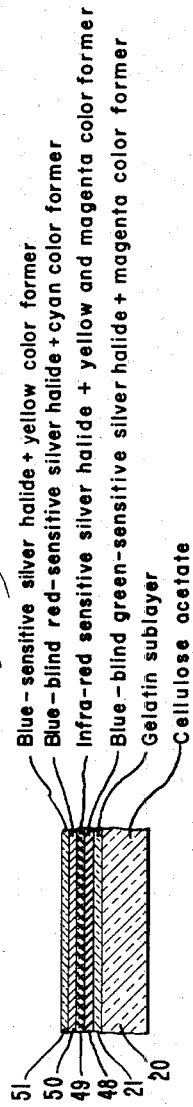
Figure 20 is a schematic sectional view of the film element of Example VI.

A photographic film as shown in Figure 20 of the drawing, comprises a transparent cellulose acetate film base 21, a blue-blind green-sensitive gelatino-silver chloride emulsion layer 48 containing the magenta color-former as described in Example I, an infrared sensitive Lippmann-type gelatino-silver bromide emulsion layer 49 containing the yellow and magenta color-formers as described in Example I, a blue-blind red-sensitive silver chloride emulsion layer 50 containing a cyan color-former as described in Example I, and a blue-sensitive silver bromide emulsion layer 51 containing a yellow color-former as described in Example I. The film is given an exposure of low intensity from the emulsion side, which exposes all layers except the Lippmann emulsion. After being developed for 2 minutes at 70° F. in a color developer as described in Example I, the film is given a second overall exposure thru a "Wratten" No. 87 filter from either the emulsion or base side, development is continued for a total of 6 minutes and the film is washed, fixed, bleached, fixed, washed and dried as set for in Example I. The unwanted blue absorption of the magenta dye and the unwanted blue and green absorptions of the cyan dye are well corrected as in Example III.

In place of the specific immobile or non-diffusing color-formers described in the foregoing examples, which are essentially colorless compounds, various other color-formers having such properties can be substituted in the foregoing examples and analogous procedures with similar results. In these color-formers the color-forming nucleus has as the active color-coupling group a structure which may be represented by the formula:

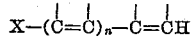

wherein X is HO— or RHN—, wherein R is hydrogen or an aliphatic group and $n$ is 0 or 1. Compounds of this type include phenolic or naphtholic compounds and aromatic primary or secondary amines with hydrogen or replaceable groups, e.g., halogen, carboxyl and sulfonic acid groups para to the hydroxyl and active methylene compounds such as acylacetarylides, cyanoacetyl compounds, pyrazolones and other heterocyclic active methylene-containing compounds. While these are the preferred color-formers, this invention works equally well with couplers and color developers that yield other types of dyes, for instance, the phenazonium and azine dyes as described in the follownig U.S. patents: Coles 2,524,725, Schmidt et al. 2,536,010 and 2,543,338, Tulagin et al. 2,524,741, 2,525,502, 2,525,503 and 2,591,642, and the dyes described in Jennen U.S. Patent 2,673,801.

Immobilization of these color-formers in the emulsion layers may be accomplished in a number of ways. For instance, high molecular weight substituents including alkyl chains of 12 or more carbon atoms and polycyclic groups may be attached to the color-formers to provide immobility in water-permeable colloid layers, as described in U.S. Patent 2,179,244 or the color-formers may be immobilized by dispersing in a non-aqueous phase as shown in U.S. Patent 2,272,191. One particularly useful method of immobilization involves the formation of color-forming polyvinyl acetals.

The preferred color-formers are essentially colorless, synthetic polymers which have colloid properties and contain a plurality of aliphatic hydroxyl groups usually, vinyl alcohol units ($-CH_2-CHOH-$ groups), in the polymer chain as the predominant hydrophilic group and have as an integral part of their molecular structure color-former nuclei of the foregoing structure. They also preferably contain solubilizing groups from acetalization with an aldehyde containing such a group, e.g., $-SO_3Na$ and $-CO_2Na$. The general structure of these synthetic color-forming, water-permeable colloids may be represented as:

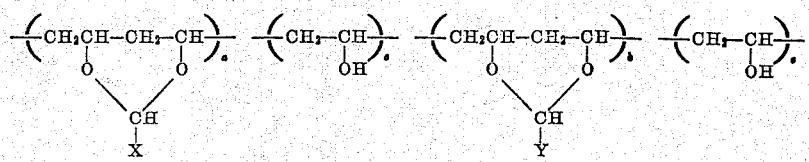

where X is a color-former group or nucleus and Y is a group enhancing hydrophilic character, and the numbers $a$, $b$ and $c$ are selected to contribute the desired degree of colloid properties and to provide the required color density after color-coupling development. Such polymers are described in more detail in U.S. Patent 2,310,943 and in the J. Am. Chem. Soc., 73, 4930 (1951).

These color-formers when used in light-sensitive silver halide layers may constitute the sole binding agents for the silver halide grains or they can be mixed with polyvinyl alcohol, polyvinyl acetals or partially hydrolyzed polyvinyl esters which are water-soluble or hydrophilic in character and/or other natural or synthetic colloid binding agents for silver halide grains, including gelatin.

Similarly various other primary aromatic amino color-developing agents can be used in place of the specific one in the foregoing examples. Suitable additional ones are described in the British Journal of Photography, October 14, 1938, pages 647–648. These color-developing agents can be used in the form of their addition salts, e.g., hydrochlorides and hydrosulfates, which are more soluble and more stable than the free bases.

Various types of hydrophobic films can be used as the base film for the multilayer photographic elements described above. Suitable bases include cellulose derivatives, e.g., cellulose nitrate, cellulose acetate, cellulose acetate propionate, cellulose acetate butyrate; superpolymers, e.g., polyvinyl chloride, poly(vinyl chloride co vinyl acetate), and polyethylene terephthalate. The known anchoring sublayers which are useful with such bases can be used to anchor the silver halide emulsion layers to the bases.

The supplementary exposure is most simply carried out during color development. However, if desired, the development can be stopped by washing the film and drying, then giving the supplementary exposure and completing development and processing.

This invention is, of course, not limited to camera negative films but may be applied equally well to any multilayer color transparency from which copies, prints, duplicates, or other reproductions in color are to be made. Thus the color values in any multilayer color camera negative, master positive, duplicating negative, or other intermediate film may be improved by use of this invention.

Another advantage of the invention is that it provides new film structures and a method of processing which can be readily operated to yield multicolor images of nearly ideal color values.

The invention has the additional advantage in that it provides a practical and effective process for correcting the undesirable absorption of quinoneimine and azomethine dye images in the reproduction of original developed multicolor images.

We claim:

1. A multilayer photographic color film comprising a transparent film base bearing three light-sensitive silver halide emulsion layers and a yellow filter layer so disposed and sensitized that each layer is essentially sensitive to a different primary color region of the visible spectrum taken from the group consisting of blue, green and red regions and contains a non-diffusing essentially colorless, organic color former wherein the color forming nucleus has as the active color coupling group an atomic structure represented by the formula:

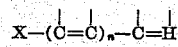

wherein X is a member of the group consisting of HO—,

and where R is an aliphatic group, and $n$ is a number from 0 to 1, said color former being capable of forming, with the oxidation product of a primary aromatic amine developing agent during the development of exposed silver halide with such an agent, a dye of a subtractive color and taken from the group consisting of quinoneimine and azomethine dyes, and a single masking silver emulsion layer sensitive to light of wavelengths above 700 m$\mu$ and relatively insensitive to light below 700 m$\mu$ contiguous with the lowermost of the other said three emulsion layers, said masking layer containing at least 1 non-diffusing color former of the aforesaid type, the subtractive dye image yielded in the masking layer upon development with the same developing agent being orange and having principal absorption spectra in the regions of the unwanted absorption of the subtractive dyes in the two silver halide emulsion layers nearest said masking layer, said two layers containing cyan and magenta dyes, respectively.

2. A film as set forth in claim 1 wherein the essentially blue-sensitive emulsion layer is outermost and contains a color former capable of yielding a yellow subtractive dye.

3. A film as set forth in claim 1 wherein said masking layer contains non-diffusing color formers capable of yielding yellow and magenta dyes respectively, to form an orange masking image.

4. A film as set forth in claim 3 wherein the yellow filter layer is below and contiguous with the blue-sensitive layer.

5. A film as set forth in claim 3 wherein said masking layer is the lowermost layer.

6. A film as set forth in claim 3 wherein the lowermost emulsion layer is red-sensitive.

7. A film as set forth in claim 3 wherein the lowermost emulsion layer is red-sensitive and contains a color former capable of yielding a cyan dye.

8. A film as set forth in claim 3 wherein the lowermost layer is green-sensitive.

9. A film as set forth in claim 3 wherein the lowermost layer is green-sensitive and contains a color former capable of yielding a magenta dye.

10. A film as set forth in claim 3 wherein said color formers are polyvinyl acetals having a plurality of lateral color-forming nuclei as defined in claim 3.

References Cited in the file of this patent
UNITED STATES PATENTS

| | | |
|---|---|---|
| 2,219,987 | Gasper | Oct. 29, 1940 |
| 2,258,187 | Mannes et al. | Oct. 7, 1941 |
| 2,348,735 | Gasper | May 16, 1944 |
| 2,393,756 | Dearing | Jan. 29, 1946 |
| 2,403,722 | Jelley et al. | July 9, 1946 |
| 2,571,698 | Fierke | Oct. 16, 1951 |
| 2,592,514 | Harsh | Apr. 8, 1952 |
| 2,694,008 | Berger | Nov. 9, 1954 |